A. BENDER.
PROCESS OF SULFONATION OF AROMATIC HYDROCARBONS.
APPLICATION FILED SEPT. 12, 1918.
1,301,360.
Patented Apr. 22, 1919.
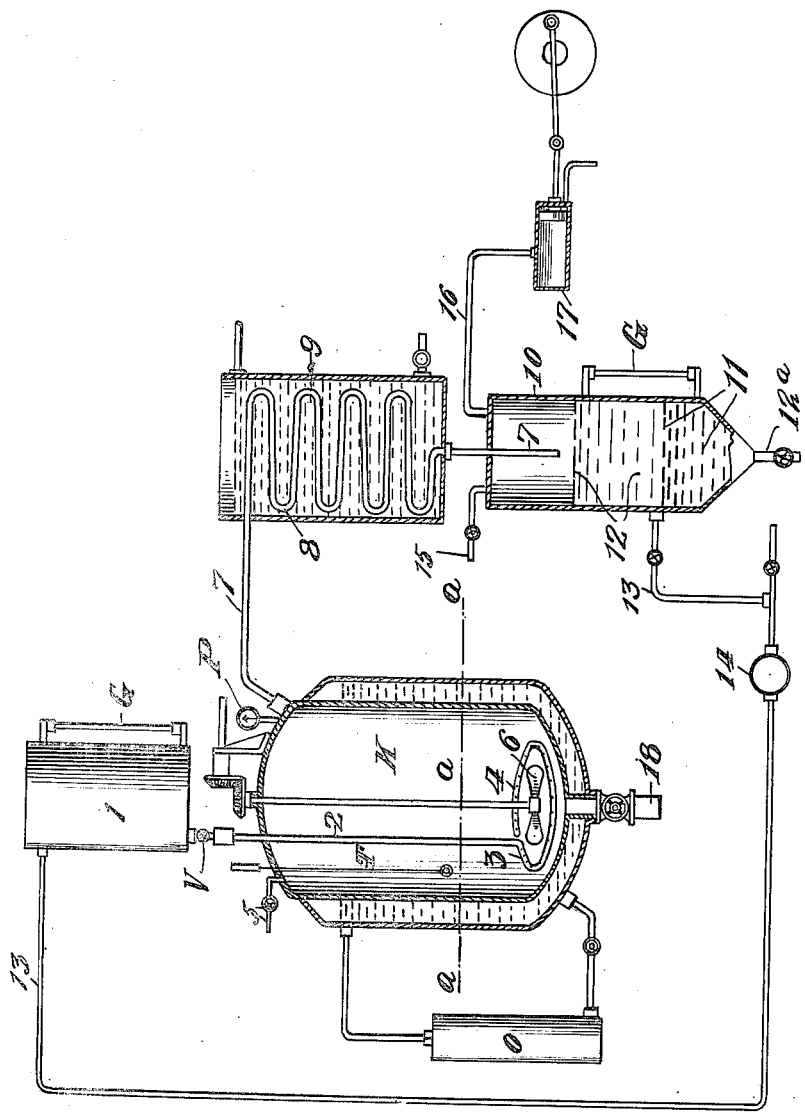
INVENTOR
Andrew Bender
BY
Edmund S. Beach
ATTORNEY

UNITED STATES PATENT OFFICE.

ANDREW BENDER, OF BOGOTA, NEW JERSEY, ASSIGNOR OF ONE-THIRD TO EDWARD S. BEACH, OF RIDGEFIELD, CONNECTICUT.

PROCESS OF SULFONATION OF AROMATIC HYDROCARBONS.

1,301,360.     Specification of Letters Patent.     Patented Apr. 22, 1919.

Substitute for application Serial No. 244,720, filed July 13, 1918. This application filed September 12, 1918. Serial No. 253,778.

*To all whom it may concern:*

Be it known that I, ANDREW BENDER, a citizen of the United States, residing in Bogota, Bergen county, and State of New Jersey, have invented certain new and useful Improvements in Processes of Sulfonation of Aromatic Hydrocarbons, of which the following is a specification.

This invention relates to a process of sulfonation of aromatic hydrocarbons and has for its object the more economic production of commercial chemicals, such as phenol and resorcinol, derived from sulfonated benzene ($C_6H_6$).

In the accompanying drawing forming a part hereof, I show diagrammatically one form of apparatus suitable for use in practising my new process, and in this drawing 1 is a benzene supply reservoir and G is its gage glass; a feed pipe 2 leads from the reservoir downwardly into an oil heated, closed kettle K, the oil heater being indicated by O. Any kind of kettle heater may be used. Pipe 2 terminates in a coil 3 in the bottom portion of the kettle, the coil being formed with benzene escape ports 4. The kettle is supplied with sulfuric acid through its valved intake 5. The level of the kettle charge of acid is indicated by line $a$—$a$. The kettle is supplied with a mechanical agitator 6 for stirring the acid while benzene vapor is rising from the escape ports 4 through the kettle charge. P is a pressure gage and T a thermometer for the kettle charge. From the top of the kettle a benzene and water vapor escape pipe 7, having between its ends bends 8 in a cooling tank 9, leads into a closed receiving tank 10, for reception of the condensed benzene and water vapors, the water 11 being the heavier, going to the bottom of the tank and the benzene 12, being the lighter, floating on the water. This tank is provided with a sight gage glass G. A valved water discharge pipe 12ª is provided at the bottom of this tank 10, from which, above the normal water level, a valved benzene escape pipe 13 leads into the benzene reservoir 1 through a benzene pump 14, which may be operated whenever desired. Tank 10 has at its top a valved air intake pipe 15, and from its top an exhaust pipe 16 leads to an exhaust pump 17 for use in evacuating the air in the apparatus. The benzene in reservoir 1 is under atmospheric pressure. In its descent through pipe 2, the benzene volatilizes under heat from the kettle, and in the form of vapor flows upwardly through the kettle charge of sulfuric acid; and is, during this sulfonation step, partially absorbed by the acid, some benzene vapor escaping into the upper part of the kettle and flowing to the condenser formed by the pipe bends in the cooling tank. Practically no water from the mixture now forming the kettle charge is carried over. During this sulfonation step, the exhaust pump is not in operation and the vent pipe 15 is open to the atmosphere, so that the apparatus is working with its contents wholly under atmospheric pressure, the least degree of pressure practically desirable being approximate atmospheric pressure, which is preferred as the minimum pressure during the sulfonation step.

When such sulfonation has reached the state in which there is practically no further absorption of benzene under the given conditions, as will be evidenced by an analysis of a sample from the kettle, the valve in vent pipe 15 is closed, all valves except this vent valve having been closed during such sulfonation; and the exhaust pump 17 is set in motion for removing the air from the apparatus, thereby putting the kettle charge consisting of a mixture of benzene-sulfonic acid, sulfuric acid and water, under a vacuum. Under this condition, the valve V in the benzene feed pipe 2 is gradually opened to permit the benzene vapor gradually to flow upwardly into and through the mixture, thereby gradually carrying over during such flow, much of the water that was formed during the preceding step of sulfonation.

While my new process may be used for the production of toluene and xylene sulfonic acids, yet since such two acids have little, if any, commercial value at the present time, I will describe my process in connection with the production of benzene mono-sulfonic acid used in the production of phenol and benzene disulfonic acid used in the production of resorcinol.

Under the present process, in the manufacture of benzene mono-sulfonic acid where the commercial product in view is phenol ($C_6H_5OH$), sulfuric acid as weak as 66 degrees Bé. can be used and in the manufacture of benzene disulfonic acid where the commercial product in view is resorcinol ($C_6H_4(OH)_2$), the mono-sulfonic acid can be produced from weak sulfuric acid and then sulfonated further to di-sulfonic acid with oleum.

Of all known aromatic hydrocarbons, benzene ($C_6H_6$) is perhaps the only one the sulfonation of which is commercially desired and benzene may be sulfonated to either mono-sulfonic acid or di-sulfonic acid.

Assuming that phenol is to be the ultimate product, I make initially a charge for the kettle by sulfonating benzene with preferably 98 to 100 per cent. sulfuric acid, by commingling the benzene with the sulfuric acid under a pressure equal at least to atmospheric pressure, and in the presence of heat until the ratio of the free sulphuric acid in the mixture to the water in the mixture is reduced to about 78 to 22 involving the reaction

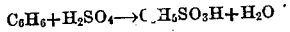

In making this kettle charge, if 66° Bé. or weaker sulfuric acid is used for making such initial kettle charge, its temperature should be raised to about 80° C. before the benzene is commingled with it; but if more concentrated sulfuric acid, such as 98 to 100 per cent. strength is used, no preliminary heating is necessary because the greater strength of acid present allows more rapid reaction; but in either case, in order to get as much benzene as possible to enter into combination with the sulfuric acid, this initial kettle charge has its temperature increased during the sulfonation to from 150° C. to 180° C.

Noting that in the production of benzene mono-sulfonic acid or benzene di-sulfonic acid, water is formed in accordance with the above or similar reaction, the object of this invention is to get rid of the water produced by the reaction as rapidly and cheaply as possible.

It is proposed in Tyrer's U. S. Patent No. 1,210,725 to get rid of this water by the continuous operation of passing benzene vapor through the charge at atmospheric pressure, and at a temperature of about 185° C.

By my invention, however, the initial sulfonated charge obtained as above described is at some convenient time subsequent to the time of production of such charge or at some place other than the place of production of such charge, subjected in vacuo at preferably 150° C. to 180° C. temperature, to benzene vapor, which treatment reduces the aqueous content of the sulfonated charge, in consequence of the fact that the charge has a definite water vapor pressure at the given temperature and the passage of the benzene vapor through the charge facilitates sweeping out the water vapor. While it is preferable to subject the initial sulfonated charge in vacuo to a temperature of from 150° C. to 180° C. yet water may be removed but less rapidly by working at a lower temperature down to say about 130° C. While there is remaining in the sulfonated mixture to be treated in vacuo considerable free sulfuric acid, a temperature somewhat higher than a temperature 160° C. is desirable, up to about 180° C. Nevertheless when the sulfonic acid reaches a very concentrated state such high temperature must be avoided in order to prevent decomposition of the sulfonic acid.

While it is economically desirable to sulfonate under at least atmospheric pressure as stated, that is, at a pressure of about 15 lbs. per square inch, yet in fact sulfonation may be effected but less rapidly at varying degrees of pressure from slightly above 0 or in vacuo up to about 15 lbs. per square inch; and further the sulfonation which consists in the absorption of benzene vapor by sulfuric acid would proceed much more rapidly if the pressure were even greater than 15 lbs. per square inch; but mechanical difficulties of effecting a mechanical pressure make it desirable not to employ a pressure above atmospheric pressure. I do not wish to limit my invention to at least atmospheric pressure in the sulfonation, but if the pressure is less than atmospheric the absorption of benzene is too slow to be commercially satisfactory if the most economic results are desired; and in vacuo absorption of benzene by sulfuric acid practically stops. If, however, the pressure is slightly under atmospheric, the absorption will occur, but less rapidly than at atmospheric pressure. But under such conditions, the water of reaction would not be removed except only in traces by the passage of the benzene vapor through the charge; and so as to accomplish this result, I have invented the present process of successive alternating sulfonation and water elimination as a solution of the problems involved.

It will be noted that the benzene vapor is forced through the sulfonated mixture and preferably from the bottom. The result of this treatment of the sulfonated mixture with benzene vapor has the effect of reducing the ratio of the water in the so treated mixture to the free sulfuric acid therein below the ratio of 22 to 78; and in this condition the mixture thus produced is available for further reaction with benzene and is itself to be sulfonated in the manner described, to make a second sulfonated mixture which is itself to be treated with benzene vapor in the manner described, again producing a mixture from which more water may be eliminated and such mixture itself may be in accordance with this process again sulfonated and again subjected to benzene vapor in vacuo. In other words, each successive sulfonated mixture, after it has been treated with the benzene vapor, has a reduced water content, and these two immediately sequent steps of sulfonation and benzene treatment are in practice repeated from four to six times, until a sulfonic acid containing five per cent. or less of free sulfuric acid is obtained.

This product of my method is of great commercial importance in the manufacture of phenol for the following reasons:

The product is a concentrated sulfonic acid of 90 per cent. strength or higher.

It is obtained without, as in a well known prior process, forming a benzene solution of the benzene sulfonic acid from which the sulfonic acid is extracted by means of water, the benzene sulfonic acid ultimately being obtained in aqueous solution more or less dilute.

In the manufacture of phenol, the benzene sulfonic acid must be converted into its sodium salt, sodium benzene sulfonate, $(C_6H_5SO_3Na)$. The usual procedure consists in adding enough lime to the mixture of benzene sulfonic acid and sulfuric acid to convert the two acids completely into their respective calcium salts, after which a mineral sodium salt is added to convert the calcium salt of the sulfonic acid into its sodium salt. This last step precipitates all of the calcium as insoluble compounds and leaves the sodium benzene sulfonate in solution, which is next freed from the calcium salts by filtering. The filtrate which is rather dilute from the necessary washing of the precipitated calcium salts is then evaporated to dryness, and the sodium salt of the sulfonic acid is thus obtained. By my process the relative purity of the benzene sulfonic acid makes it possible to convert it directly into its sodium salt by means of sodium carbonate after, if desired, adding just enough lime to precipitate the small amount of free sulfuric acid present. The reaction is

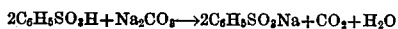

This results in a saving of at least 90 per cent. of the lime and reduces the amount of calcium salts that must be washed and dumped in the same proportion. Since the calcium salts are never washed free of sodium benzene sulfonate, a material reduction in the amount of these calcium salts reduces the amount of sodium benzene sulfonate lost in this way.

In the later stage in my process, the necessary sodium carbonate is produced in concentrated solution for the formation of the sodium benzene sulfonate. Because of the high concentration of both the benzene sulfonic acid and the sodium carbonate solution, the resulting sodium benzene sulfonate solution is of 32 to 38 per cent. strength, instead of the usual 12 to 20 per cent. strength; and since this solution must be evaporated to dryness, there is a corresponding saving of evaporating equipment and fuel.

The next step in the manufacture of phenol consists in fusing the dry sodium benzene sulfonate with caustic soda, from which results a mixture consisting chiefly of sodium phenate $(C_6H_5ONa)$, sodium sulfite $(Na_2SO_3)$ and the excess of caustic soda $(NaOH)$ together with impurities. By adding the fusion charge to from one to one and one-half parts of water, a partial solution of this mixture is effected, which results in a very concentrated solution of sodium phenate and caustic soda and containing only traces of sodium sulfite. By allowing the sodium sulfite to settle and decanting the clear supernatant solution, a very concentrated solution of sodium phenate and caustic soda is obtained. By passing the carbon dioxid, liberated when previously adding sodium carbonate to the sulfonic acid, through the solution of sodium phenate and caustic soda by means of an absorption tower, phenol is liberated from the phenate and the caustic soda is converted into sodium carbonate according to the following equations

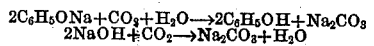

The resulting solution after removal of the phenol is a pure solution of sodium carbonate and can be used in the previous part of the process just outlined.

The sodium sulfite remaining after decanting the concentrated solution of sodium phenate and caustic soda above referred to is next dissolved in water or filtered out and the resulting liquor is acidified with sulfuric acid and the small amount of phenol thus liberated is recovered in the usual way.

Since the entire fusion charge after solution is in some processes acidified with sulfuric acid to liberate the phenol, the use of carbon dioxid for a portion of the charge results in a saving of at least 70 per cent. of the sulfuric acid.

When making benzene di-sulfonic acid with reference to the manufacture of resorcinol, I merely add to the concentrated mono-sulfonic acid prepared in the manner described above, sufficient oleum to convert the mono-sulfonic acid into the di-sulfonic acid and proceed to the production of resorcinol in the usual manner.

This application is a continuation in part and a substitute for my application Serial No. 244,720, filed July 13, 1918.

What I claim is:

1. The herein-described process of making benzene sulfonic acid, consisting in sulfonating benzene by commingling it with sulfuric acid under at least approximate atmospheric pressure, and in the presence of heat, until the ratio of free sulfuric acid to water is reduced to about 78:22 by the reaction

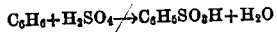

and in which reaction water is produced; and in subjecting, in vacuo and under a temperature of from about 150° C. to about 180° C., the foregoing mixture of benzene-sulfonic acid, sulfuric acid and water to benzene vapor, thereby reducing the water content of the mixture and making the sulfuric acid remaining in the mixture available for combining with additional benzene, in consequence of the reduction of the ratio of the water to sulfuric acid in the mixture to below 22:78.

2. The herein-described process of making benzene sulfonic acid consisting in subjecting in vacuo and under a temperature of from about 130° C. to about 180° C. a mixture of benzene sulfonic acid, sulfuric acid and water having a ratio of water to free sulfuric acid of about 22:78, thereby reducing the ratio of the water to free sulfuric acid to below 22:78 and making the sulfuric acid remaining in the mixture available for further reaction with benzene.

3. The process of making a concentrated benzene sulfonic acid consisting in a series of alternating sulfonation steps and water eliminating steps, each sulfonation step consisting in commingling under at least approximate atmospheric pressure a charge containing sulfuric acid with benzene and each water-eliminating step consisting in subjecting the previously sulfonated mixture in vacuo and at a temperature of from about 130° C. to about 180° C. to benzene vapor, and thereby eliminating much of the water of reaction formed during the preceding sulfonation step.

In testimony whereof I have hereunto set my hand this 11th day of September, 1918.

ANDREW BENDER.